Dec. 29, 1936.  F. F. UEHLING  2,065,841
AUTOMATIC TEMPERATURE CONTROL APPARATUS
Original Filed June 29, 1932  3 Sheets-Sheet 1
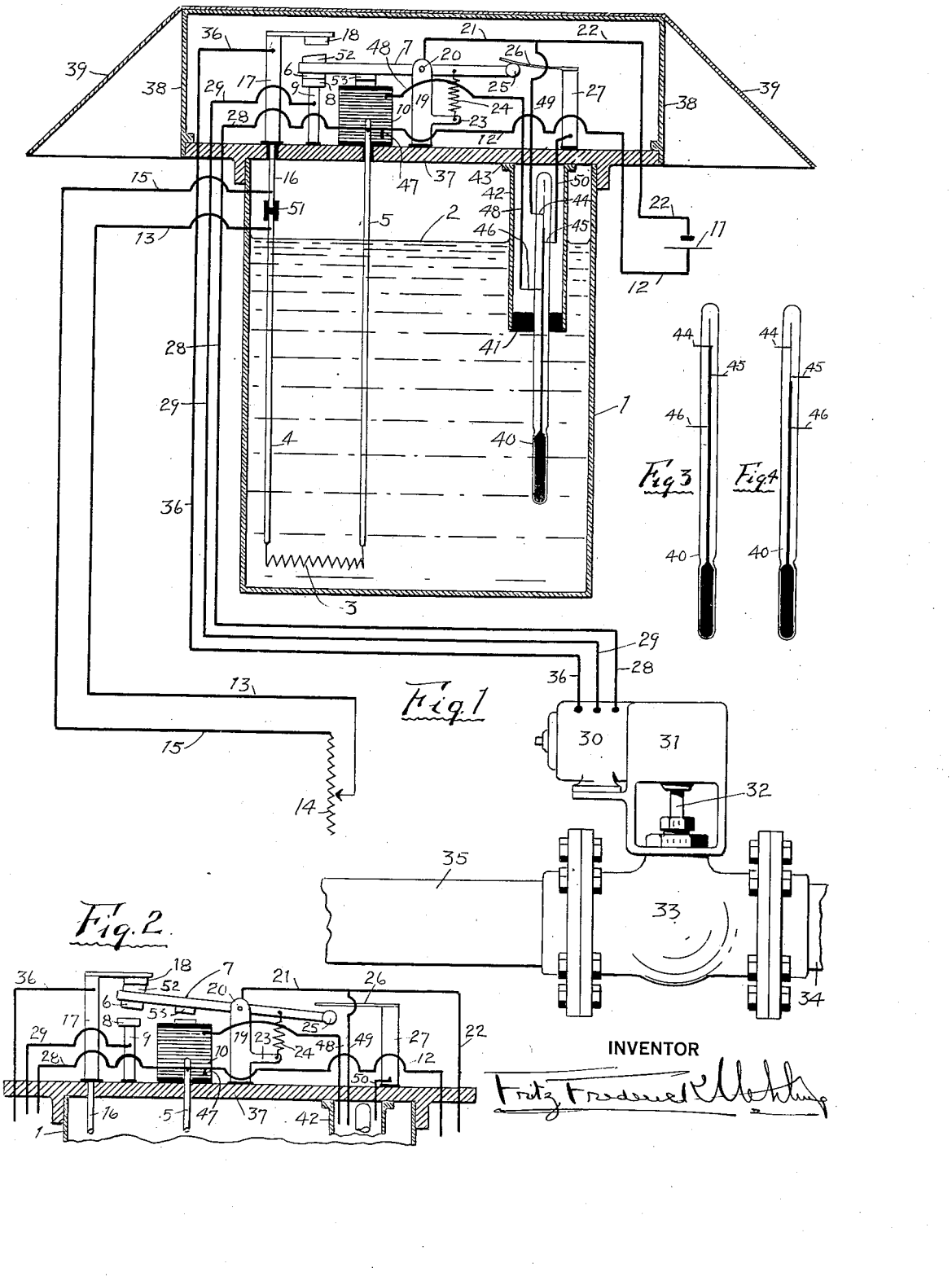
INVENTOR
Fritz Frederick Uehling

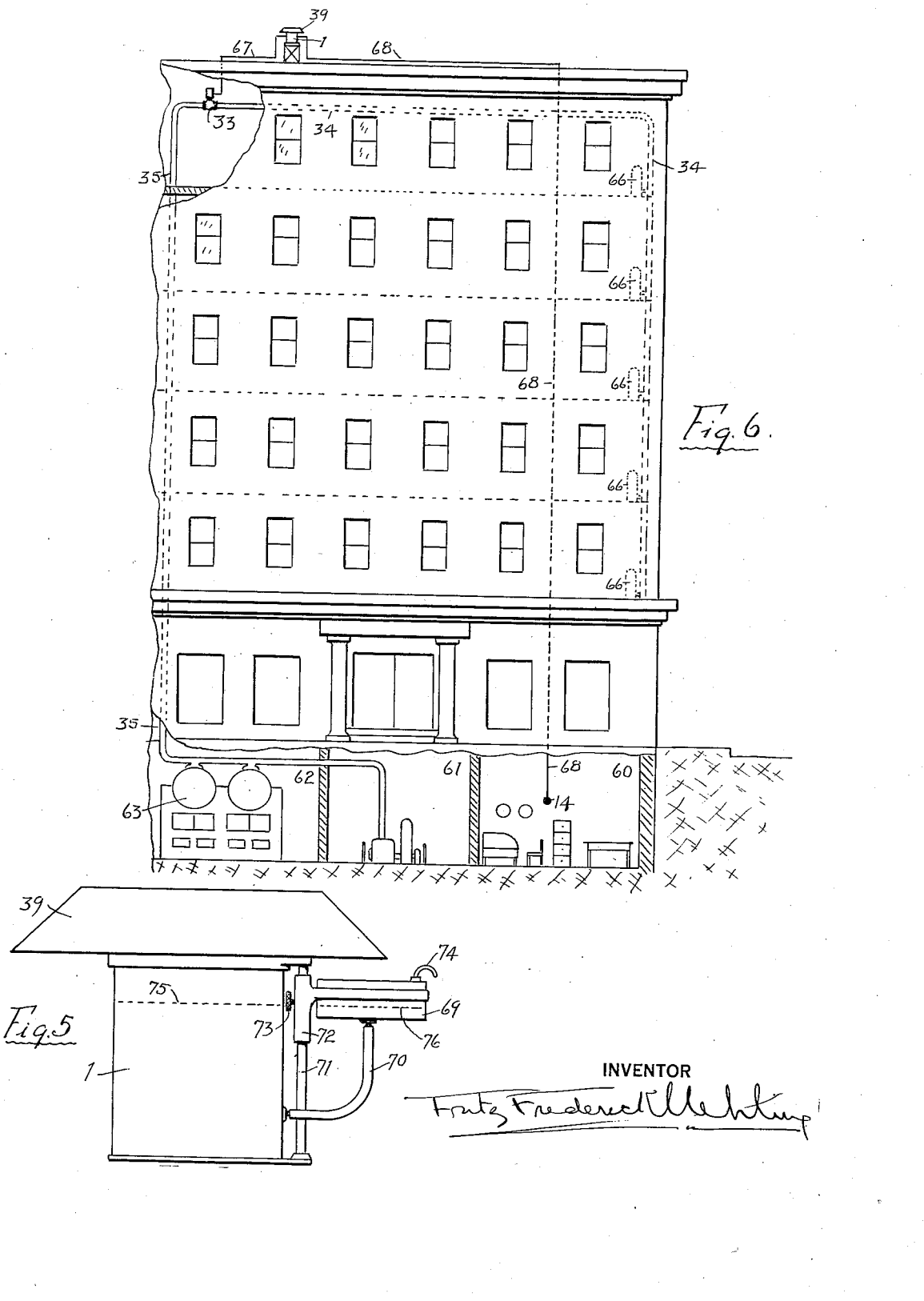

Dec. 29, 1936.  F. F. UEHLING  2,065,841
AUTOMATIC TEMPERATURE CONTROL APPARATUS
Original Filed June 29, 1932   3 Sheets-Sheet 3
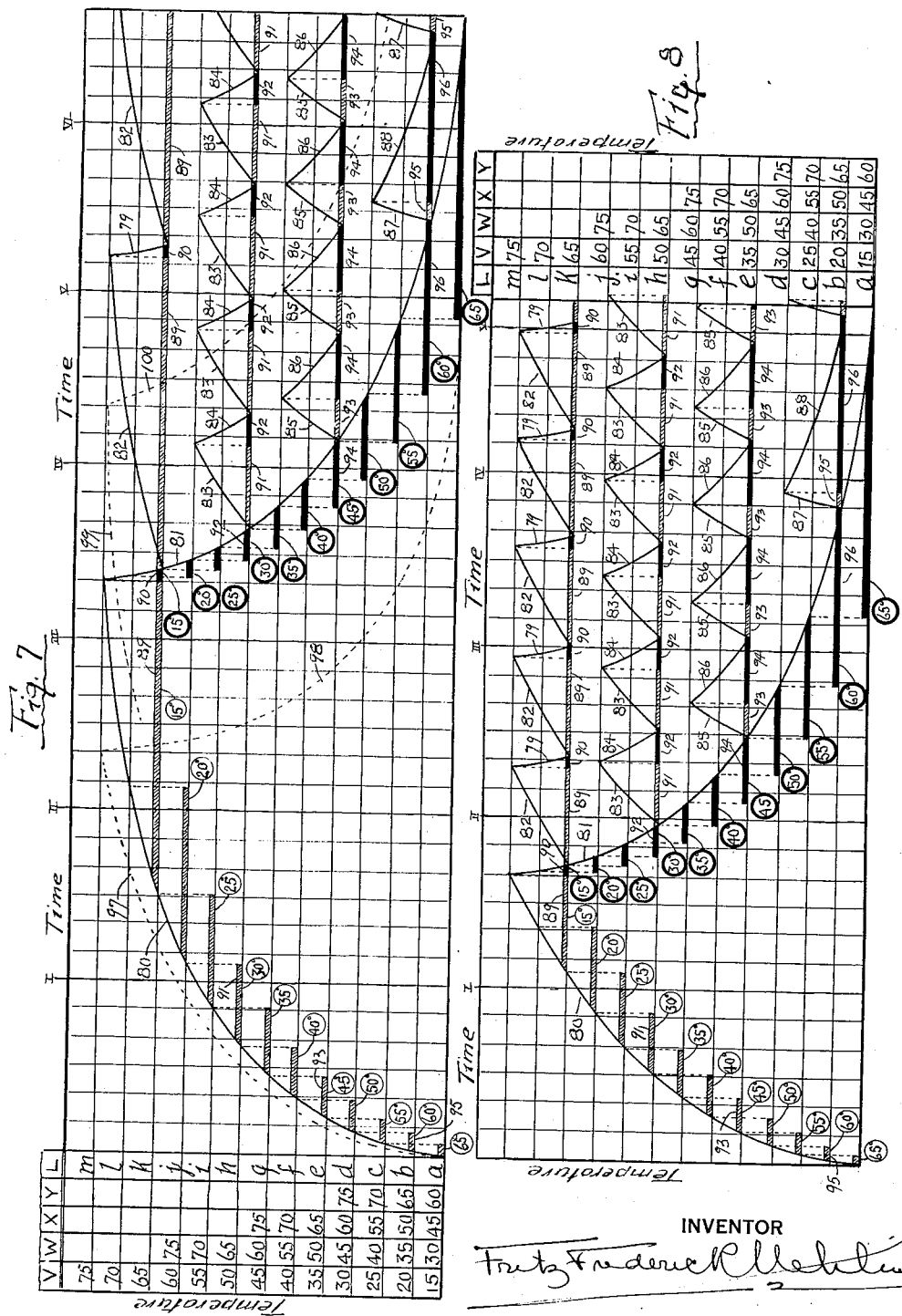
INVENTOR
Fritz Frederick Uehling Patented Dec. 29, 1936

2,065,841

UNITED STATES PATENT OFFICE 2,065,841

AUTOMATIC TEMPERATURE CONTROL APPARATUS

Fritz Frederick Uehling, Passaic, N. J., assignor to Minneapolis-Honeywell Regulator Company, Minneapolis, Minn., a corporation of Delaware Application June 29, 1932, Serial No. 619,841
Renewed May 7, 1936

20 Claims. (Cl. 236—91)

This invention relates to automatic means for regulating the temperature in a building or in any other housing or chamber. More particularly it relates to improvements in that type of temperature regulating apparatus which depends for its functioning on changes in outside atmospheric conditions rather than on changes in the temperature within the building itself. The invention therefore provides a novel means for changing the rate of heat input to a building in proportion to changes in atmospheric conditions outside the building. In the particular form of the invention herein described, a valve, through which steam heat is supplied to a building, is automatically kept open a longer period of time and closed a shorter period of time, or kept closed a longer period of time and open a shorter period of time, depending respectively on whether the atmospheric temperature outside of the building has decreased or increased, thus automatically changing the ratio of the valve's open period to the valve's closed period as required to maintain the desired temperature in the building.

Figure 1 illustrates, partly in cross section and partly diagrammatically, all of the more essential elements of the invention; Figure 2 illustrates a definite position of a relay which relay is also shown in Figure 1 in the opposite position; Figures 3 and 4 illustrate a mercurial thermometer with electric contact points, with respect to which the mercury of the thermometer is in a different position in each figure, said mercurial thermometer being also included in Figure 1; Figure 5 is an elevation illustrating a means for changing the quantity of liquid in the vessel 1 of Figure 1; Figure 6 illustrates a building to which the temperature regulator is applied; Figures 7 and 8 illustrate certain heating and cooling curves which are of importance in simplifying the description of the novel features of the invention. Similar numerals refer to similar parts in all illustrations.

A vessel 1, Figure 1, contains a liquid 2 which liquid is heated by an electric heater 3. The circuit which energizes the heater and which includes a battery or any other source 11, is open or closed depending upon the position of an arm 7 which forms part of a relay suspported by a base 37, which base also acts as a cover for the vessel 1. An electro-magnet 10 which forms part of the relay is fastened to the base 37. The arm 7 which is pivoted at 20 is held by a support 19 which support is fastened to but insulated from the base 37. Contact pieces 6 and 52 are fastened to one end of the arm 7 and make contact with contact piece 8 or contact piece 18 respectively depending upon whether the magnet is energized or deenergized. The contact piece 18 is supported by an upright 17 which is fastened to but insulated from the base 37. Similarly the contact piece 8 is fastened to an upright 9 which is also fastened to but insulated from the base 37. A spring 24, one end of which is fastened to extension 23 and the other end of which is fastened to the arm 7 as illustrated, holds the contact piece 52 against the contact piece 18, Figure 2, when the magnet 10 is deenergized. A contact piece 25, Figure 1, is fastened to the other end of the arm 7, as illustrated, said contact piece making electric contact with a flat spring 26 when the magnet is energized. This spring is fastened to an upright 27 which is attached to but insulated from the base 37. It thus follows, Figure 1, that when the magnet 10 is energized, electric contact will be established between 6 and 8, and between 25 and 26. Similarly when the magnet 10 is deenergized, Figure 2, electric contact will be established between 52 and 18, and electric contact between 25 and 26, and between 6 and 8 will be broken.

The circuit which includes the heater 3 starts at battery 11, from battery 11 through wire 12 to the upper end of a rod 5, thence through rod 5 and the heater 3 to a rod 4, from the rod 4 through wire 13 to an adjustable rheostat 14, from the rheostat through wire 15 to a rod 16, and from the rod 16 through the upright 17 to the contact piece 18. When the magnet 10 is deenergized, the contact piece 52, Figure 2, will touch the contact piece 18 thereby closing the circuit which continues from the contact piece 18 through the arm 7 and wires 21 and 22 back to the battery, Figure 1. It thus follows that when the magnet 10 is energized, the heater 3 will be deenergized, and when the magnet 10 is deenergized the heater 3 will be energized. The heater 3 is supported by the rods 4, 5, and 16. The rods 5 and 16 are fastened to but insulated from the base 37 while the rods 4 and 16 are insulated from each other by an insulation piece 51. The rheostat 14 which is included in the heater circuit forms a very important part of this invention and will be presently referred to in further detail.

A mercurial thermometer 40, Figure 1, which has three contact wires 44, 45, and 46, is sealed into a tube 42 at 41. The tube 42 is fastened to the base 37 at 43 thereby holding the thermometer in place, as illustrated. The contact wires 44, 45, and 46 are sealed into the stem of the thermometer to permit electric contact with the mercury in the stem at predetermined temperatures of the liquid 2. The electric circuits which include the mercury in the thermometer and the contact wires 44 and 45 also include the magnet 10 and the battery 11. Thus if the temperature of the liquid 2 is such that the mercury in the thermometer just touches the contact wire 44, Figure 3, the magnet 10 will be energized. The circuit which includes the contact wire 44 and the magnet 10 starts at battery 11, Figure 1, thence through wires 12 and 47 to the magnet 10, from the magnet 10 through the wire 48 to the contact wire 46, from the contact wire 46 through the mercury to the contact wire 44, Figure 3, and thence, Figure 1, through wires 49 and 22 back to the battery. The magnet 10 being thus energized, Figure 1, contact will be broken between 18 and 52 thereby deenergizing the heater 3 which will permit the liquid 2 to cool and cause the mercury column in the thermometer 40 to drop. In this position of the arm 7, as illustrated in Figure 1, the contact established between 25 and 26 will however short-circuit the contact wires 44 and 45 through wires 21, 49, and 50. The magnet 10 will therefore remain energized until the temperature of the liquid 2 reaches a point where the electric contact between the mercury in the thermometer and the contact wire 45 will be broken, Figure 4. When this happens the magnet 10 will be deenergized and by means of the spring 24, the arm 7 of the relay will assume the position illustrated in Figure 2, thereby again closing the circuit through the heater 3 by the established contact between 52 and 18, and at the same time breaking the electric connection to the contact wire 45 through 25 and 26. The heater will thus again raise the temperature of the liquid 2 until the mercury reaches the contact wire 44, Figure 3, at which time the cycle will repeat itself. It is obvious therefore that the liquid 2 will cool until the mercury in the thermometer drops to a point slightly below the contact wire 45 at which time the magnet 10 is deenergized thereby closing the circuit through the heater 3. The temperature of the liquid 2 will then be increased until the mercury reaches the contact wire 44 at which time the relay will again open the circuit through the heater thereby permitting the liquid to again cool. It thus follows that the heater 3 will be energized for a sufficient length of time only to raise the temperature of the liquid sufficiently to cause the mercury to expand from the contact wire 45 to the contact wire 44 at which time the relay will be actuated to open the circuit through the heater thereby allowing the liquid to cool only until the mercury drops below the contact wire 45 at which time, in the manner previously stated, the heater will be energized again. It is therefore obvious that the temperature of the liquid will continue to fluctuate between a fixed high temperature and a fixed low temperature indefinitely, said high and low temperatures being determined by the fixed positions of the contact wires 44 and 45. It is further obvious that the time required to increase the temperature sufficiently to cause the mercury to rise from the contact wire 45 to the contact wire 44, and that the time required to permit the liquid to radiate sufficiently to cause the mercury to drop from the contact wire 44 to 45 will depend upon the temperature of the atmosphere surrounding the vessel 1, and the rate of heat input through the heater 3.

The relay which energizes or deenergizes the heater 3, depending upon whether the magnet 10 is deenergized or energized, also respectively opens or closes a motor operated valve 33, Figure 1. This valve is actuated by a motor 30 which is in geared connection with the valve stem 32 through a gear box 31. The motor 30 operates to open or close the valve depending upon whether the motor is energized through wires 28 and 36 or through wires 28 and 29. The energy which operates the motor 30 also comes from the battery 11. The circuit which actuates the motor to close the valve 33 when the relay is in the position illustrated in Figure 1 starts at battery 11, thence through wires 12 and 28 to the motor 30, from the motor 30 through wire 29 to the upright 9 and thence through contact pieces 8 and 6, arm 7 and wires 21 and 22 back to the battery. Similarly the circuit which actuates the motor to open the valve 33 when the relay is in the position illustrated in Figure 2 starts at battery 11, Figure 1, thence through wires 12 and 28 to the motor 30, from the motor 30 through wire 36 to contact piece 18, Figure 2, from contact piece 18 through contact piece 52, arm 7, and wires 21 and 22 back to the battery, Figure 1. The valve 33 will therefore be open during the period of time that the heater 3 is energized and closed during the period of time that the heater 3 is deenergized, this cycle repeating itself indefinitely in the manner previously described. It thus follows that the valve 33 will be open for the period of time which is required by the heater to heat the liquid 2 sufficiently to raise the mercury column from the contact wire 45 to the contact wire 44, and that the valve will be closed for the period of time which is required for the liquid 2 to radiate sufficiently to cause the mercury to drop from the contact wire 44 to the contact wire 45.

As already stated, the primary object of the invention is to increase or decrease the heat input to a building in proportion to changes in atmospheric conditions outside of the building in order to provide uniform temperature within the building. The building, Figure 6, which illustrates this application has its basement divided into three compartments, the chief engineer's office 60, the engine room 61 and the boiler room 62. The motor operated valve 33 which may be located anywhere, for example on the top floor, opens and closes the steam flow to any number of radiators 66 located throughout the building. The radiators are connected with the outlet side of the valve through the pipe 34 while the inlet side of the valve is connected with a steam boiler 63 or with any other source of steam supply through the pipe 35. The vessel 1 which contains the liquid heated by the heater 3, Figure 1, is preferably located on the top of the building, Figure 6, where changes in outside temperature, and changes in wind velocity will change the rate of heat radiation from the liquid in the vessel. In order to protect the vessel against rain and snow, a hood 39 is provided as illustrated. The hood is fastened to a cover 38, Figure 1, which cover protects the relay already referred to. Although in the illustration the relay is located on top of the vessel it is obvious that it may be provided as a separate unit located anywhere but connected in the manner already described. The two wires 13 and 15, Figure 1, which connect rheostat 14 (to be later referred to) are represented in Figure 6 by a two-wire cable 68, and the three wires 28, 29 and 36, Figure 1, are represented in Figure 6 by a three-wire cable 67.

In order to adequately describe the functioning of this apparatus, let us assume as already stated that the vessel 1 is located on the top of the building as illustrated in Figure 6 and that the thermometer 40 which is located in the liquid has its contact wires 44 and 45 located at points respectively corresponding to 75 degrees Fahrenheit and 65 degrees Fahrenheit. Under these conditions and in the manner already described, the liquid in the vessel 1 is automatically heated by the heater 3 until the temperature of the liquid reaches 75 degrees, then allowed to cool by radiation until the temperature of the liquid drops to 65 degrees, the cycle repeating itself indefinitely so long as the heating capacity of the heater 3 is sufficient to heat the liquid in the vessel 1 to 75 degrees, and so long as the atmospheric temperature is sufficiently low to permit the heat in the liquid to radiate until its temperature drops below 65 degrees. Furthermore, in the manner already described, the valve 33 will be open during the period in which the liquid in the vessel is being heated from 65 degrees to 75 degrees, and closed during the period in which the liquid is cooling from 75 degrees to 65 degrees.

The curve 80, Figure 7, represents a heating curve for the liquid in the vessel 1 by plotting temperature against time as illustrated, with the assumption that the heater 3 has sufficient capacity to heat the liquid in the vessel sixty degrees above the temperature of its surrounding atmosphere. For example, the liquid is capable of being heated from 15 degrees Fahrenheit to 75 degrees Fahrenheit when the temperature of the atmosphere surrounding the vessel is 15 degrees Fahrenheit. This is illustrated by curve 80, Figure 7, with respect to the temperature scale V. It is obvious that the curve 80 will have the same general form for any particular temperature of the atmosphere surrounding the vessel. As further examples, if the temperature of the atmosphere surrounding the vessel is 30 degrees the curve 80, Figure 7, will apply with respect to the temperature scale W. Again if the temperature of the surrounding atmosphere is 45 degrees the curve will apply with respect to the temperature scale X, and if the temperature of the surrounding atmosphere is 60 degrees the same curve, Figure 7, will apply with respect to scale Y. In other words, the curve will apply for any atmospheric condition so long as the initial temperature line $a$, column L, represents the atmospheric temperature, and each consecutive temperature line $b$, $c$, $d$, etc. represents an increase of five degrees in the temperature of the liquid.

It thus follows that if the temperature of the atmosphere surrounding vessel 1 is 15 degrees, the curve 80, Figure 7, between the temperature line $a$ and the temperature line $m$, column L, will determine with respect to the temperature scale V, the time required to heat the liquid from 15 degrees to 75 degrees, and similarly that part of the curve between the line $k$ and the line $m$ with respect to the same temperature scale V, will determine the time required to heat the liquid from 65 degrees to 75 degrees, when the temperature of the surrounding atmosphere is 15 degrees Fahrenheit. In like manner that part of the curve 80 between the temperature line $a$ and the temperature line $j$, will determine the time required to heat the liquid from 30 degrees to 75 degrees with respect to the temperature scale W when the temperature of the surrounding atmosphere is 30 degrees. Also that part of the curve 80 between the temperature lines $h$ and $j$ will determine the time required to heat the liquid from 65 degrees to 75 degrees with respect to the temperature scale W when the temperature of the surrounding atmosphere is 30 degrees. Again that part of the curve 80 between the temperature lines $a$ and $g$ with respect to the temperature scale X will determine the time required to heat the liquid from 45 degrees to 75 degrees when the temperature of the surrounding atmosphere is 45 degrees, and that part of the curve 80 between the temperature lines $e$ and $g$ with respect to the temperature scale X will determine the time required to heat the liquid from 65 degrees to 75 degrees when the temperature of the surrounding atmosphere is 45 degrees. Similarly that part of the curve 80 between the temperature lines $a$ and $d$ with respect to the temperature scale Y will determine the time required to heat the liquid from 60 degrees to 75 degrees when the temperature of the surrounding atmosphere is 60 degrees, and that part of the curve 80 between the temperature lines $b$ and $d$ with respect to the temperature scale Y will determine the time required to heat the liquid from 65 degrees to 75 degrees when the temperature of the surrounding atmosphere is 60 degrees. The actual time required to heat the liquid in vessel 1 from 65 degrees to 75 degrees for different temperatures of the atmosphere surrounding the vessel is illustrated by the hatched bands at the right of and immediately adjacent to the curve 80, Figure 7, each band being labeled with a light circle in which the atmospheric temperature is stated. Obviously and as will be noted from the different lengths of the hatched bands, the higher the temperature of the atmosphere surrounding the vessel the less will be the time required to heat the liquid from 65 degrees to 75 degrees.

The curve 81, Figure 7, represents a cooling curve for the liquid in the vessel 1 by plotting temperature against time as illustrated, with the assumption that the high point of the curve which coincides with the line $m$ is 60 degrees above the low point of the curve which coincides with the line $a$, and that the line $a$ represents the temperature of the atmosphere surrounding the vessel. For example, curve 81, Figure 7, represents the rate of cooling of the liquid in vessel 1 with respect to the temperature scale V when the temperature of the atmosphere surrounding the vessel is 15 degrees. It is obvious that the cooling curve 81, Figure 7, will have the same general form for any particular temperature of the atmosphere surrounding the vessel. As further examples, if the temperature of the atmosphere surrounding the vessel is 30 degrees the same cooling curve 81 will apply with respect to the temperature scale W. Again if the temperature of the surrounding atmosphere is 45 degrees the same cooling curve will apply with respect to the temperature scale X, and if the temperature of the surrounding atmosphere is 60 degrees the curve 81 still applies but with respect to the temperature scale Y. In other words the cooling curve 81 will apply for any atmospheric condition so long as the initial temperature line $a$ represents the atmospheric temperature.

It therefore follows that if the temperature of the atmosphere is 15 degrees and the heater 3 has been shut off when the temperature of the liquid has reached 75 degrees, the curve 81 between the temperature lines $m$ and $a$ will determine with respect to the temperature scale V the time required for the liquid to radiate from 75 degrees to 15 degrees and that part of the curve between the temperature lines m and k with respect to the scale V will determine the time required for the liquid to radiate from 75 degrees to 65 degrees when the temperature of the surrounding atmosphere is 15 degrees. In like manner, that part of the curve 81 between the temperature line j and the temperature line a will determine the time required for the liquid to radiate from 75 degrees to 30 degrees with respect to the temperature scale W when the temperature of the surrounding atmosphere is 30 degrees. Also that part of the curve 81 between the temperature lines h and j with respect to the temperature scale W will determine the time required for the liquid to radiate from 75 degrees to 65 degrees when the temperature of the surrounding atmosphere is 30 degrees. Again that part of the curve 81 between the temperature lines g and a with respect to the temperature scale X will determine the time required for the liquid to radiate from 75 degrees to 45 degrees, and that part of the curve 81 between the temperature lines g and e with respect to the temperature scale X will determine the time required for the liquid to radiate from 75 degrees to 65 degrees when the temperature of the surrounding atmosphere is 45 degrees. Similarly that part of the curve 81 between the temperature lines d and a with respect to the temperature scale Y will determine the time required for the liquid to radiate from 75 degrees to 60 degrees when the temperature of the surrounding atmosphere is 60 degrees, and that part of the curve 81 between the temperature lines d and b with respect to the temperature scale Y will determine the time required for the liquid to radiate from 75 degrees to 65 degrees when the temperature of the surrounding atmosphere is 60 degrees. The actual time required for the liquid in vessel 1 to radiate from 75 degrees to 65 degrees for different temperatures of the atmosphere surrounding the vessel is illustrated by the black bands at the left of and immediately adjacent to the cooling curve 81, Figure 7, each band being labeled with a heavy circle in which the atmospheric temperature is stated. Obviously and as will be noted from the different lengths of the black bands, the higher the temperature of the atmosphere surrounding the vessel, the longer it will take for the liquid to radiate from 75 degrees to 65 degrees.

As stated above, the time required to heat the liquid from 65 degrees to 75 degrees, and the time required for the liquid to radiate from 75 degrees to 65 degrees, when the temperature of the atmosphere is 15 degrees, is represented respectively by the hatched band 89 and the black band 90, said bands being respectively labeled with a light circle and a heavy circle, in which circles the atmospheric temperature (15°) is stated. As soon as the heater 3 has heated the liquid to 75 degrees, the heater 3 and the steam valve 33, in the manner already stated, will be simultaneously shut off. This will permit both the building and the liquid to radiate until the temperature of the liquid reaches 65 degrees, at which time the heater 3 and the valve 33 will, in the manner already stated, again be turned on until the temperature of the liquid again reaches 75 degrees, this cycle repeating itself so long as the temperature of the atmosphere remains 15 degrees Fahrenheit. The consecutive heating and cooling of the liquid in the vessel between the temperatures 75 degrees and 65 degrees, and represented respectively by the curves 82 and the curve 79 with respect to the temperature scale V, Figure 7, will obviously repeat themselves so long as the temperature of the surrounding atmosphere remains 15 degrees. The consecutive periods during which the valve is open when the temperature of the atmosphere is 15 degrees may therefore be represented by the hatched portions 89 of the band along the temperature line k, and the consecutive periods during which the valve is closed may be represented by the black portions 90 of the same band.

Similarly the time required to heat the liquid from 65 degrees to 75 degrees, and the time required for the liquid to radiate from 75 degrees to 65 degrees, when the temperature of the atmosphere is 30 degrees, is represented respectively by the hatched band 91 and the black band 92, said bands being respectively labeled with a light circle and a heavy circle, in which circles the atmospheric temperature (30°) is stated. As soon as the heater has heated the liquid to 75 degrees, the heater 3 and the steam valve 33 will, in the manner already stated, be simultaneously shut off. This will permit both the building and the liquid to radiate until the temperature of the liquid reaches 65 degrees at which time the heater 3 and the valve 33 will, in the manner already stated, again be turned on until the temperature of the liquid again reaches 75 degrees, this cycle repeating itself so long as the temperature of the atmosphere remains 30 degrees. The consecutive heating and cooling of the liquid in the vessel between the temperatures 75 degrees and 65 degrees, and represented respectively by the curves 83 and the curves 84 with respect to the temperature scale W, Figure 7, will obviously repeat themselves so long as the surrounding temperature of the atmosphere remains 30 degrees. When the temperature of the atmosphere is 30 degrees the consecutive periods during which the valve 33 is open may therefore be represented by the hatched portions 91 of the band along the temperature line h, and the consecutive periods during which the valve 33 is closed may be represented by the black portions 92 of the same band.

Again the time required to heat the liquid from 65 degrees to 75 degrees, and for the liquid to radiate from 75 degrees to 65 degrees when the temperature of the atmosphere is 45 degrees, is represented respectively by the hatched band 93 and the black band 94, said bands being respectively labeled with a light circle and a heavy circle in which the atmospheric temperature (45°) is stated. As soon as the heater 3 has heated the liquid to 75 degrees, the heater and the steam valve 33 will, in the manner already stated, be simultaneously shut off. This will permit both the building and the liquid to radiate until the temperature of the liquid reaches 65 degrees, at which time the heater 3 and the valve 33 will, in the manner already stated, again be turned on until the temperature of the liquid again reaches 75 degrees, this cycle repeating itself so long as the temperature of the atmosphere remains 45 degrees. The consecutive heating and cooling of the liquid in the vessel between the temperatures 75 degrees and 65 degrees, and represented respectively by the curves 85 and the curves 86 with respect to the temperature scale X, Figure 7, will obviously repeat themselves so long as the temperature of the surrounding atmosphere remains 45 degrees. Therefore when the temperature of the atmosphere is 45 degrees the consecutive periods during which the valve 33 is open and the consecutive periods during which the valve 33 is closed may be illustrated respectively by the hatched portions 93 and the black portions 94 of the band along the temperature line e with respect to the temperature scale X. Similarly when the temperature of the atmosphere is 60 degrees the consecutive periods during which the valve 33 is open and the consecutive periods during which the valve 33 is closed are shown respectively by the hatched portions 95 and the black portions 96 of the band along the temperature line b with respect to the temperature scale Y.

It will be noted from the above that the length of the period during which the valve 33 remains open decreases as the temperature of the surrounding atmosphere increases, while the length of the period during which the valve 33 is closed increases as the temperature of the surrounding atmosphere increases. In other words the ratio of the period during which the valve is open to the period during which the valve is closed approaches infinity as the temperature of the atmosphere decreases. For example, if the temperature of the atmosphere becomes low enough the valve will remain open indefinitely. This will obviously happen when the heater 3 is not capable of raising the temperature of the liquid to 75 degrees under the atmospheric conditions involved. Similarly it will be noted that the length of the period during which the valve 33 remains closed increases as the temperature of the surrounding atmosphere increases while the period during which the valve 33 remains open decreases as the temperature of the surrounding atmosphere increases. In other words the ratio of the period during which the valve is closed to the period during which the valve is open approaches infinity as the temperature of the atmosphere increases. For example, if the temperature of the atmosphere becomes high enough the valve will remain closed indefinitely. This will obviously happen when the temperature of the atmosphere is too high to permit the liquid to radiate to a temperature below 65 degrees. The increments between the above ratios as the atmospheric temperature changes will obviously be unlimited, thus providing a definite ratio of the time the valve is open to the time the valve is closed for every definite atmospheric condition to which the vessel 1 is subjected. Furthermore said ratio increases as the outside temperature decreases which is as it should be in order to keep the valve open for longer periods as the weather grows colder.

In practice the correct capacity of the heater 3 and the correct quantity or mass of the liquid or other medium heated by the heater would be determined by experiment or by calculation to suit a properly designed heating system. In such a case the radiation of heat from the building would be in proper proportion to the radiation from the liquid, and the rate of heat input to the liquid would be in proper proportion to the rate of heat input to the building to establish the proper ratio between the valve's open period and the valve's closed period as described in connection with Figure 7, to maintain an even temperature within the building. It is easily conceived, however, that some buildings may be provided with excessive heating surface for keeping the building warm. In such a case the temperature of the building might be kept at too high a temperature by the automatic arrangement above described when the heater 3 has a certain prescribed capacity and the liquid 2 a certain prescribed mass. It is for this reason that I have provided the rheostat 14 or any other means for changing the rate of heat input to the heater 3, which rheostat or other similar means as previously stated forms a very important part of this invention. If, for example, the temperature in the building as maintained by the valve 33 is too high, the rheostat 14 may be adjusted to increase the rate of heat input to the heater 3 thereby heating the liquid at a greater rate. In such a case the heating curve 80 would take the foreshortened form as illustrated in Figure 8. With this particular curve, when the temperature of the atmosphere is 15 degrees the time required to heat the liquid from 65 degrees to 75 degrees would be represented by the hatched portions 89 along the temperature line k with respect to the temperature scale V, which it will be noted is considerably shorter than the same hatched portions 89 illustrated in Figure 7. It is obvious, however, that the increased rate of heating the liquid 2 will have no effect on the rate at which this liquid cools when the heat has been turned off. The cooling curve 81 of Figure 8 is therefore the same as the cooling curve 81, Figure 7. It therefore follows that by adjusting the rheostat 14 to increase the heat input to the heater 3, the time during which the valve 33 is open will be decreased, Figure 8, as compared with Figure 7, while the time during which the valve is closed will not be affected. In like manner the rheostat 14 may be adjusted to decrease the rate of heat input to the heater 3 thereby increasing the period during which the valve is open, for any given atmospheric condition. In such a case the curve 80 will be elongated instead of foreshortened as illustrated in Figure 8. The numerals of both Figures 8 and 7 are identical so that the previous description with respect to the Figure 7 can be applied to Figure 8. It will thus be noted that in both Figures 7 and 8 the ratio of the time the valve is open to the time the valve is closed decreases as the atmospheric temperature increases, but by changing the rate of heat input to the heater 3 by means of the rheostat 14 the ratio of the time the valve is open to the time the valve is closed may be increased or decreased proportionately for all atmospheric conditions, depending upon whether the rheostat is turned in one direction or the other. In order therefore to facilitate adjustment to establish the proper ratio between the heating of the liquid in the vessel 1 and the cooling of the liquid in the vessel 1 to suit a particular building, the rheostat 14 is preferably placed in the chief engineer's office 60 as illustrated in Figure 6 already referred to.

Another adjustment that can be made with respect to the curves 80 and 81, Figure 7, is to change the mass or quantity of liquid in the vessel 1 which is heated by the heater 3. This can be accomplished for example by a chamber 69, Figure 5, which is slidably mounted on a rod 71 alongside of the vessel 1, and which can be fastened in any fixed position by means of a set screw 73 which holds the sleeve 72 tightly against the rod 71. The chamber 69 is connected with the vessel 1 by means of a flexible connection 70 so that the liquid in the vessel 1 may communicate with the space in the chamber 69 to establish a common level 75, a vent 74 being provided to relieve the air pressure above the liquid in the chamber 69. It is obvious that by increasing or decreasing the elevation of the chamber 69 the quantity of liquid in the vessel 1 can be varied accordingly. It is further obvious that by increasing the quantity of liquid in the vessel 1 both the time required for the heater 3 to heat the liquid in the vessel 1 and the time for the liquid to radiate will be increased. Increasing the quantity of liquid in vessel 1 would thus spread out both the heating curve 80 and the cooling curve 81, Figure 7, thereby changing their form to the dotted curves 99 and 100 respectively. Similarly if the quantity of liquid in vessel 1 is decreased the heating curve 80 and the cooling curve 81, Figure 7, would change their form to the dotted curves 97 and 98 respectively. Although a change in the quantity of liquid in the vessel 1 will not change the ratio of the time the valve will be open to the time the valve is closed, it will change the actual length of time that the valve is open and the actual length of time that the valve is closed for any given atmospheric condition. This adjustment therefore in combination with the adjustment provided by means of the rheostat 14 provides means for adjusting the temperature regulation system in question to suit any particular building or to suit any particular climatic condition in order to maintain a specified temperature within very narrow limits within the building itself. It is also obvious that since an adjustment of the rheostat 14 changes the ratio of the period during which the valve is open to the period during which the valve is closed, this adjustment may not only be used to adjust the system to meet the particular characteristics of the building for the purpose of maintaining a certain temperature within the building, but the adjustment may also be utilized to actually change the fixed temperature which is automatically maintained within the building.

Although I have illustrated and described a mercurial thermometer as the thermostatic element for regulating the heat input to the building, it is obvious that any other suitable form of thermostat or temperature actuated medium may be substituted without in any way departing from this invention. Furthermore any form of heater and any form of mass may be respectively substituted for the electric heater and the medium under its influence without in any way affecting the following claims. Likewise with slight modifications such as required to reverse the action of the motor valve, the same apparatus and methods may be utilized to regulate a cooling system for maintaining within narrow limits a temperature in a building or chamber below that of the surrounding atmosphere.

It might also be stated that although, for the purpose of description, I have provided a range of temperature from 15 degrees to 75 degrees for the temperature scale V, Figures 7 and 8, it is obvious that the low point of this scale would represent the lowest temperature that might be expected in the particular locality where the control system is used. Furthermore the range of 10 degrees for the temperature of the liquid in the vessel to open and close the valve as described may be increased or decreased without in any way affecting the principle involved.

I claim:

1. In a device of the class described, the combination with a vessel containing a variable amount of fluid, of means for heating the fluid, a chamber located apart from the vessel, means for heating the inside of the chamber, means for simultaneously turning on both heating means at a predetermined temperature of the fluid, and means for simultaneously turning off both heating means at a predetermined higher temperature of the fluid.

2. In a device of the class described, the combination with a vessel containing a variable amount of fluid, of means for heating the fluid, a chamber located apart from the vessel, means for heating the inside of the chamber, thermostatic means in the fluid for simultaneously turning on the fluid heating means and the chamber heating means at a predetermined temperature of the fluid, and thermostatic means in the fluid for simultaneously turning off the fluid heating means and the chamber heating means at a predetermined higher temperature of the fluid.

3. In a device of the class described, the combination with a vessel containing a variable amount of liquid, of means for heating the liquid, thermostatic means for turning on the heating means at a predetermined temperature of the liquid, thermostatic means for turning off the heating means at a second predetermined temperature of the liquid, a housing and means for regulating the temperature within the housing actuated by said thermostatic means.

4. In a device of the class described, the combination with a building, of means for heating the building, a vessel containing fluid located outside of the building, means for heating the fluid, electrical means for simultaneously turning on the building heating means and the fluid heating means, a second electrical means for simultaneously turning off the building heating means and the fluid heating means, a mercurial thermometer located in the fluid, a contact wire with which the mercury in the thermometer makes electric contact when the fluid reaches a predetermined temperature, a second contact wire with which the mercury in the thermometer makes electric contact when the fluid reaches a predetermined higher temperature, an electric circuit which includes the mercury, the first contact wire and the first electrical means, and an electric circuit which includes the mercury, the second contact wire and the second electrical means.

5. In a device of the class described, the combination with a vessel containing a fluid, of means for heating the fluid, means for shutting off the heating means, a valve, means for opening the valve, means for closing the valve, a thermostatic element in the fluid for simultaneously actuating the fluid heating means and the valve opening means at a predetermined temperature of the fluid and for simultaneously actuating the shutting off means and the valve closing means at a predetermined higher temperature of the fluid.

6. In a device of the class described, the combination with a vessel containing a fluid, of means for heating the fluid, means for shutting off the heating means, a valve, means for opening the valve, means for closing the valve, an electric circuit for simultaneously actuating the fluid heating means and the valve opening means, a second circuit for simultaneously actuating the shutting off means and the valve closing means, a thermostatic element in the fluid for closing the first circuit at a predetermined temperature of the fluid and for closing the second circuit at a predetermined higher temperature of the fluid.

7. In a device of the class described, the combination with a building, of a steam heating system in the building, a valve for supplying steam to the system, automatic means for opening the valve, automatic means for closing the valve, a vessel containing a liquid located outside of the building and exposed to outside atmospheric temperatures and air currents, a cover for the vessel to protect it against rain and snow, means for heating the liquid, and thermostatic means in the liquid for simultaneously turning on the liquid heating means and actuating the valve opening means at a predetermined temperature of the liquid, and simultaneously turning off the liquid heating means and actuating the valve closing means at a predetermined higher temperature of the liquid.

8. In a device of the class described, the combination with a switch, of a second switch, a third switch, an electromagnet for closing the first and third switches and opening the second switch when said magnet is energized, means for opening the first and third switches and closing the second switch when the magnet is deenergized, a building, a valve for admitting a hot fluid to heat the building, electrical means for opening the valve, electrical means for closing the valve, a vessel containing a liquid and located outside of the building, an electric heater for heating the liquid, a rheostat for adjusting the capacity of the heater, a mercurial thermometer consisting of a bulb and capillary tube containing mercury and located in the liquid, a contact wire for making electric contact with the mercury and sealed into the capillary tube at a given distance from the bulb, a second similar contact wire sealed into the capillary tube at a greater distance from the bulb, a third similar contact wire sealed into the capillary tube at a still greater distance from the bulb, a battery, a circuit which includes the battery, the valve opening means and the second switch, a second circuit which includes the battery, the heater, the rheostat and the second switch, a third circuit which includes the battery, the valve closing means and the first switch, a fourth circuit which includes the battery, the magnet, the first contact wire, the mercury, the second contact wire and the third switch, and a fifth circuit which includes the battery, the magnet, the first contact wire, the mercury and the third contact wire.

9. In a device of the class described, the combination with a switch, of a second switch, a third switch, an electro-magnet for closing the first and third switches and opening the second switch when said magnet is energized, means for opening the first and third switches and closing the second switch when the magnet is deenergized, a building, means for heating the building, electrical means for turning on the building heating means, a second electrical means for turning off the building heating means, a vessel containing a liquid and located outside of the building in contact with atmospheric temperatures and air currents, a cover to protect the vessel against rain and snow, an electric heater for heating the liquid, a rheostat for adjusting the rate of heat input to the heater, means for adjusting the quantity of liquid in the vessel, a mercurial thermometer located in the liquid and consisting of a bulb and a capillary tube containing mercury, a contact wire for making electric contact with the mercury and sealed into the capillary tube at a given distance from the bulb, a second similar contact wire sealed into the capillary tube at a greater distance from the bulb, a third similar contact wire sealed into the capillary tube at a still greater distance from the bulb, a source of electric current, a circuit which includes the source, the first electrical means and the second switch, a second circuit which includes the source, the heater, the rheostat, and the second switch, a third circuit which includes the source, the second electric means, and the first switch, a fourth circuit which includes the source, the magnet, the first contact wire, the mercury, the second contact wire and the third switch, and a fifth circuit which includes the source, the magnet, the first contact wire, the mercury and the third contact wire.

10. In a device of the class described, the combination with a building, of a vessel containing a liquid and located outside of the building, of a medium located in the liquid and influenced by the temperature of the liquid, a contact with which the medium makes electrical contact at a predetermined temperature of the liquid, a second contact with which the medium makes electrical contact at a higher predetermined temperature of the liquid, means for heating the building, means for heating the liquid, a switch mechanism for simultaneously turning on or off the building heating means and the liquid heating means, electrical means for actuating the switch mechanism in one direction, a second electrical means for actuating the switch mechanism in the opposite direction, a circuit which includes the first electrical means, the medium and the first contact, a circuit which includes the second electrical means, the medium and the second contact, and a switch actuated by the second electrical means for short-circuiting the two contacts.

11. A first enclosed space exposed to outdoor atmospheric conditions and means for controlling its temperature, a vessel containing a variable amount of liquid exposed to the same outdoor atmospheric conditions and means for controlling the temperature of the liquid, means for simultaneously operating both temperature controlling means at a predetermined temperature of the liquid and means for simultaneously stopping the operation of both temperature controlling means at a different predetermined temperature of the liquid.

12. A first enclosed space exposed to outdoor atmospheric conditions and means for controlling its temperature, a vessel containing liquid exposed to the same outdoor atmospheric conditions and means for controlling the temperature of the liquid, means associated with the vessel for adjustably varying the volume of the liquid, means for simultaneously operating both temperature controlling means at a predetermined temperature of the liquid and means for simultaneously stopping the operation of both temperature controlling means at a different predetermined temperature of the liquid.

13. A first enclosed space exposed to outdoor atmospheric conditions and means for controlling its temperature, a vessel exposed to the same outdoor atmospheric conditions and having liquid therein, means for controlling the temperature of the liquid, thermostatic means responsive to the temperature of the liquid for simultaneously operating both temperature controlling means at a predetermined temperature of the liquid and for simultaneously stopping the operation of both temperature controlling means at a different predetermined temperature of the liquid and means associated with the vessel for varying the volume of the liquid.

14. In a device of the class described the combination with a vessel containing a liquid, of means for controlling the temperature of the liquid, means associated with the vessel for adjustably varying the volume of the liquid, a chamber located apart from the vessel, means for controlling the temperature of the chamber, means for simultaneously operating both temperature controlling means at a predetermined temperature of the liquid, and for simultaneously stopping operation of both temperature controlling means at a different predetermined temperature of the liquid, and adjustable means in the chamber for varying the action of the temperature controlling means for the liquid.

15. In a device of the class described the combination with a vessel containing a liquid of electrically operable means for controlling the temperature of the liquid, means associated with the vessel for adjustably varying the volume of the liquid, a chamber located apart from the vessel, means for controlling the temperature of the chamber, means for simultaneously operating both temperature controlling means at a predetermined temperature of the liquid and for simultaneously stopping operation of both temperature controlling means at a different predetermined temperature of the liquid, and adjustable means in the chamber for electrically varying the action of the temperature control means for the liquid.

16. In a device of the class described the combination with a building of a variable liquid mass located outside the building, means for controlling the temperature of the building, means for controlling the temperature of the liquid mass, and means responsive to the temperature of the liquid for simultaneously controlling both heat controlling means.

17. In a device of the class described the combination with a building of a liquid mass located outside the building, means for controlling the temperature of the building, means for controlling the temperature of the mass and means responsive to the temperature of the liquid for simultaneously controlling both heat control means, and means for adjustably regulating the volume of the liquid mass.

18. In a device of the class described, the combination with a building, of means for heating the building, a casing located outside of the building, means for heating the casing, electrical means for simultaneously turning on the building heating means and the casing heating means, a second electrical means for simultaneously turning off the building heating means and the casing heating means, a mercurial thermometer located in the casing, a contact wire with which the mercury in the thermometer makes electric contact when the casing reaches a predetermined temperature, a second contact wire with which the mercury in the thermometer makes electric contact when the casing reaches a predetermined higher temperature, an electric circuit which includes the mercury, the first contact wire and the first electrical means, and an electric circuit which includes the mercury, the second contact wire and the second electrical means.

19. In a temperature control system for a building, in combination, a control housing of substantial mass located outside of the building, heating means to heat the control housing and having sufficient capacity to raise the temperature of the control housing to a predetermined value in cold weather, heating means for the building, means responsive to the temperature of the control housing in control of both of said heating means, and means to vary the effective mass of said control housing.

20. In a temperature control system, in combination, a building, heating means for the building, a control housing of invariable size having substantial mass located outside of the building and subject to the same atmospheric conditions as the building, heating means for the control housing having sufficient capacity to raise the temperature of the housing to a desired value during cold weather, means responsive to the temperature of the housing in control of both of said heating means for simultaneously operating the same, and means to vary the effective mass of the control housing.

FRITZ FREDERICK UEHLING.